(12) United States Patent
De Feo

(10) Patent No.: US 10,948,104 B2
(45) Date of Patent: Mar. 16, 2021

(54) METHOD FOR MONITORING A DEVICE FOR REGULATING THE FLOW OF A GAS AND A REGULATING SYSTEM EMPLOYING SAID METHOD

(71) Applicant: PIETRO FIORENTINI S.P.A., Arcugnano (IT)

(72) Inventor: Gianfranco De Feo, Gorgonzola (IT)

(73) Assignee: Pietro Fiorentini S.P.A., Arcugnano (IT)

( * ) Notice: Subject to any disclaimer, the term of this patent is extended or adjusted under 35 U.S.C. 154(b) by 203 days.

(21) Appl. No.: 16/347,751

(22) PCT Filed: Jan. 22, 2018

(86) PCT No.: PCT/IB2018/050378
§ 371 (c)(1),
(2) Date: May 6, 2019

(87) PCT Pub. No.: WO2018/134791
PCT Pub. Date: Jul. 26, 2018

(65) Prior Publication Data
US 2019/0316706 A1 Oct. 17, 2019

(30) Foreign Application Priority Data
Jan. 23, 2017 (IT) .................. 102017000006901

(51) Int. Cl.
*F16K 37/00* (2006.01)
*G05D 16/20* (2006.01)
*F16K 31/126* (2006.01)

(52) U.S. Cl.
CPC ........ *F16K 37/0091* (2013.01); *F16K 31/126* (2013.01); *F16K 37/0025* (2013.01); *G05D 16/2095* (2019.01)

(58) Field of Classification Search
CPC .... F17D 3/01; G05D 16/163; G05D 16/2095; G05D 16/0655; G05D 16/024
See application file for complete search history.

(56) References Cited

U.S. PATENT DOCUMENTS

| 2,042,781 | A | * | 6/1936 | Grove | .................. | G05D 16/163 |
| | | | | | | 137/489 |
| 2,277,162 | A | * | 3/1942 | Soderberg | ............ | G05D 16/163 |
| | | | | | | 137/489.3 |

(Continued)

FOREIGN PATENT DOCUMENTS

DE 102 54 219 A1 6/2004
EP 522434 A1 * 1/1993

(Continued)

OTHER PUBLICATIONS

International Search Report and Written Opinion dated May 17, 2018, issued in PCT Application No. PCT/IB2018/050378, filed Jan. 22, 2018.

*Primary Examiner* — David A. Rogers
(74) *Attorney, Agent, or Firm* — Workman Nydegger

(57) ABSTRACT

A method for monitoring a device for regulating the flow of a gas, the device having a flow conduit and a shutter assembly that defines a restriction in the flow conduit. The method includes: causing the transit of gas through the flow conduit; defining a sequence of time intervals (Z1 . . . Zn) of corresponding durations (t1 . . . tn); during each time interval, determining a value of density and a value of velocity of the gas at the restriction; calculating the product of the value of density, of the value of velocity, of the duration of the time interval and of a correction coefficient to obtain a corresponding value of equivalent wear; for each time interval, adding all the values of equivalent wear calculated for the current time interval and for the preceding time intervals to obtain a cumulative value; comparing the (Continued)

cumulative values with a predefined limit value, corresponding to a condition of maximum wear allowable for the shutter assembly, to obtain an indication of the condition of efficiency of the shutter assembly.

16 Claims, 5 Drawing Sheets

(56) References Cited

U.S. PATENT DOCUMENTS

| | | | | |
|---|---|---|---|---|
| 2,991,796 | A * | 7/1961 | Griswold | F16K 31/365 137/489 |
| 3,020,925 | A * | 2/1962 | Randall | G05D 16/163 137/489.5 |
| 3,592,223 | A * | 7/1971 | Reese | G05D 16/163 137/469 |
| 4,966,188 | A * | 10/1990 | Fischer | G05D 16/163 137/489 |
| 5,159,952 | A * | 11/1992 | Ono | B05B 12/088 137/505.41 |
| 5,816,286 | A * | 10/1998 | Scott | G05D 16/163 137/489 |
| 6,189,563 | B1 * | 2/2001 | Taylor | F16K 31/1245 137/487.5 |
| 6,371,156 | B1 * | 4/2002 | Walton | G05D 16/166 137/106 |
| 6,595,237 | B2 * | 7/2003 | Cecchinato | G05D 16/163 137/488 |
| 7,318,447 | B2 * | 1/2008 | Law | G05D 16/163 137/487.5 |
| 8,091,582 | B2 * | 1/2012 | Folk | F16K 31/1262 137/489 |
| 8,371,329 | B2 * | 2/2013 | Bernardi | G05D 16/163 137/468 |
| 8,474,786 | B2 * | 7/2013 | Schneider | F16K 31/1262 251/81 |
| 8,550,101 | B2 * | 10/2013 | Folk | F16K 31/1262 137/14 |
| 9,176,505 | B2 * | 11/2015 | Cheron | G05D 16/06 |
| 9,298,190 | B2 * | 3/2016 | Oksanen | G05D 7/03 |
| 9,493,936 | B2 * | 11/2016 | Bush | E03B 7/071 |
| 9,791,059 | B2 * | 10/2017 | Amadini | F16K 17/40 |
| 9,897,258 | B2 * | 2/2018 | Imboccioli | F17D 3/01 |
| 9,920,850 | B2 * | 3/2018 | Tuineag | G05D 16/106 |
| 10,216,201 | B2 * | 2/2019 | Bodei | G05D 16/04 |
| 10,520,102 | B2 * | 12/2019 | Benetti | F16K 31/002 |
| 10,817,003 | B2 * | 10/2020 | Amadini | G05D 16/163 |
| 10,876,645 | B2 * | 12/2020 | Garvey | F16K 17/105 |
| 2008/0202606 | A1 | 8/2008 | O'Hara et al. | |
| 2009/0288718 | A1 * | 11/2009 | Jablonski | G05D 16/163 137/486 |
| 2010/0071787 | A1 * | 3/2010 | Folk | G05D 16/163 137/489 |
| 2011/0297252 | A1 * | 12/2011 | Hurley | G05D 16/163 137/488 |
| 2014/0034135 | A1 | 2/2014 | Beschorner et al. | |
| 2014/0182055 | A1 * | 7/2014 | Bush | E03D 5/02 4/378 |
| 2014/0261783 | A1 * | 9/2014 | Bush | E03D 5/105 137/487 |
| 2015/0013432 | A1 * | 1/2015 | Bush | G05D 16/2095 73/37 |
| 2015/0114491 | A1 * | 4/2015 | Oksanen | G05D 7/03 137/487 |
| 2015/0277451 | A1 * | 10/2015 | Huo | G05D 16/0655 137/505 |
| 2015/0337524 | A1 * | 11/2015 | Bush | G05D 16/2095 73/37 |
| 2016/0102811 | A1 | 4/2016 | Imboccioli et al. | |
| 2017/0218601 | A1 * | 8/2017 | Burrows | E03B 1/02 |
| 2018/0181147 | A1 * | 6/2018 | Bodei | G05D 16/04 |
| 2018/0275694 | A1 * | 9/2018 | Imboccioli | G05D 16/163 |
| 2019/0179349 | A1 * | 6/2019 | Amadini | G05D 16/163 |

FOREIGN PATENT DOCUMENTS

| | | | |
|---|---|---|---|
| EP | 0 660 017 A1 | 12/1994 | |
| EP | 683444 A1 * | 11/1995 | |
| WO | 02/17028 A1 | 2/2002 | |
| WO | WO-2006108770 A2 * | 10/2006 | G05D 16/163 |
| WO | WO-2009019237 A1 * | 2/2009 | G05D 16/163 |
| WO | WO-2009019279 A2 * | 2/2009 | G05D 16/0691 |

* cited by examiner

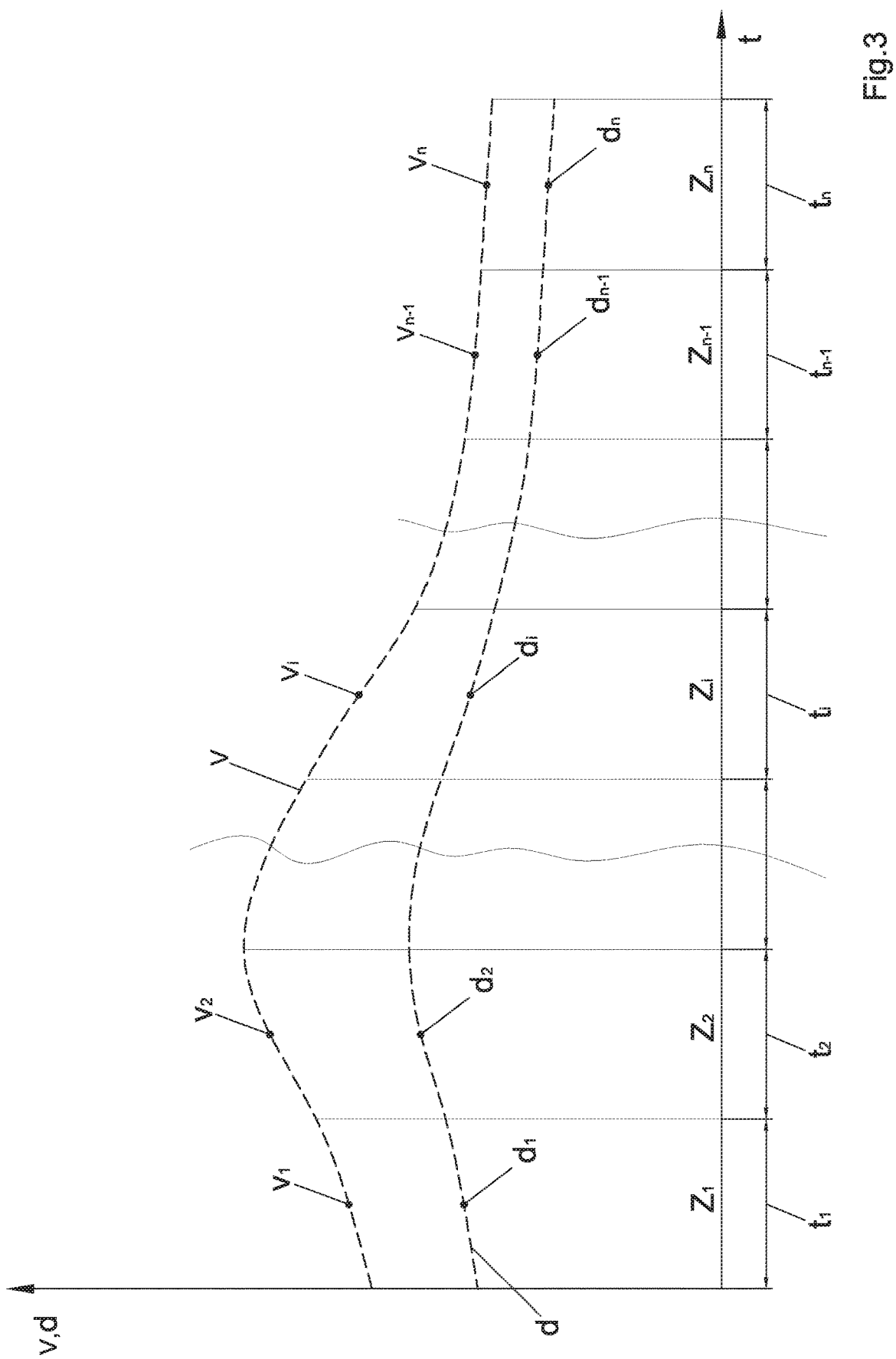

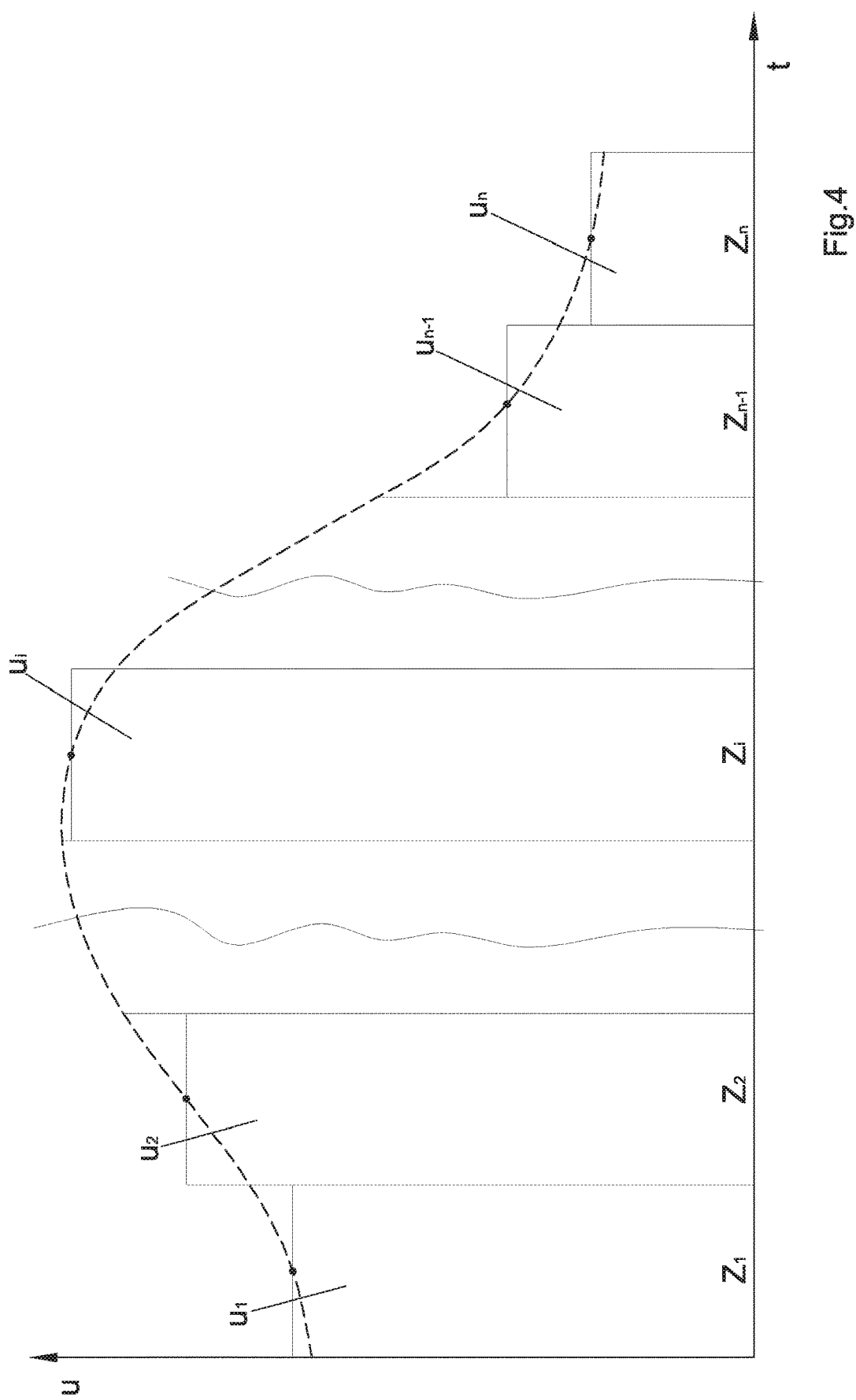

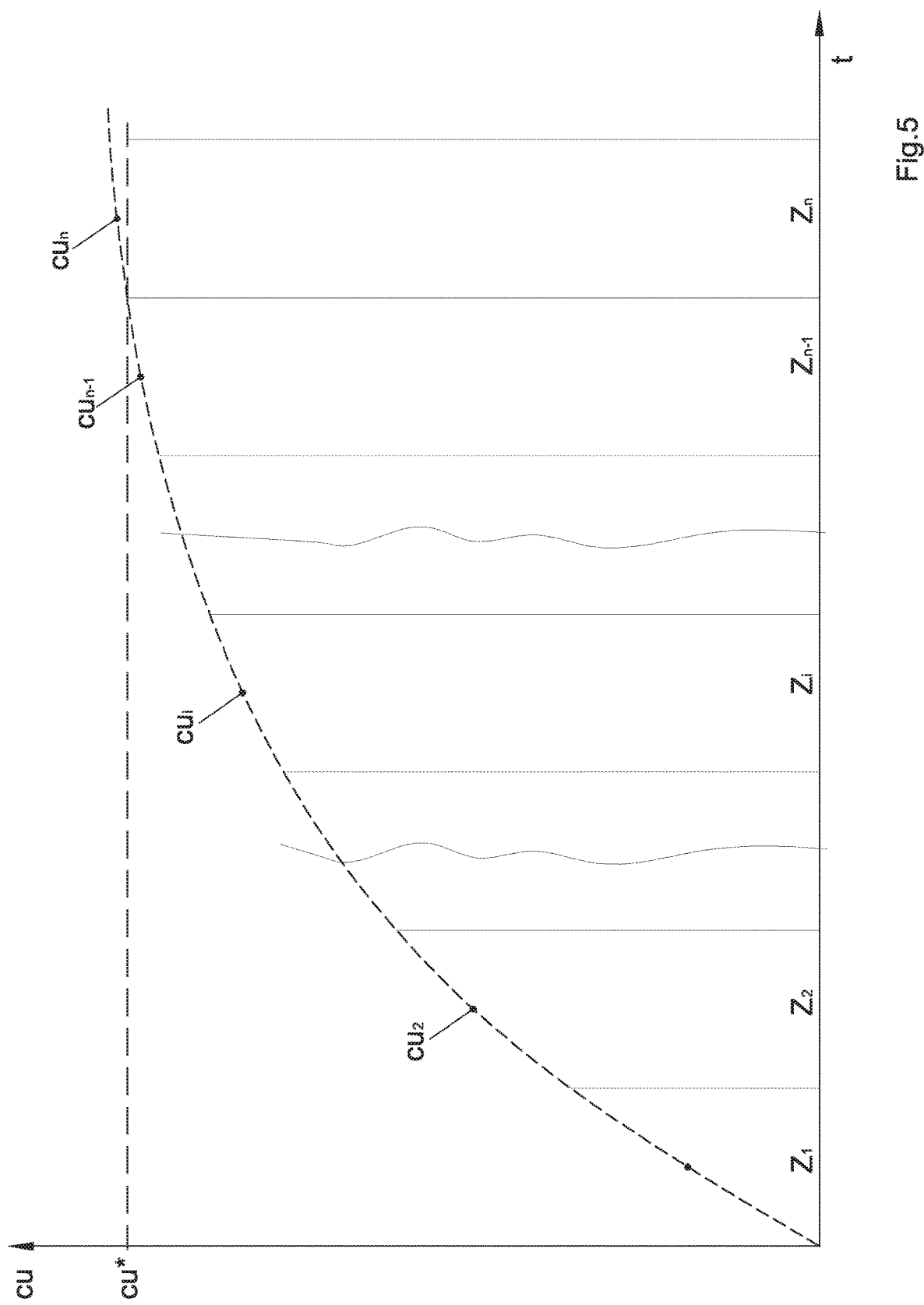

METHOD FOR MONITORING A DEVICE FOR REGULATING THE FLOW OF A GAS AND A REGULATING SYSTEM EMPLOYING SAID METHOD

BACKGROUND OF THE INVENTION

1. The Field of the Invention

The present invention relates to a method for monitoring a device for regulating the flow of a gas, particularly for a pressure reducer or for a flow rate control valve, of the type usable for example in a network for the distribution of compressed gas, in particular natural gas.

The present invention further relates to a regulating system employing the aforesaid method.

2. The Relevant Technology

As is known, natural gas is distributed to user devices through appropriate distribution networks that maintain the delivery pressure to the user devices as constant as possible, regardless of the supply pressure of the network and of the flow rate provided.

Maintenance of the delivery pressure at a constant level is assured by a regulating system that can comprise a pressure reducer positioned along a conduit of the distribution network, which reduces the supply pressure of the network to the required value to the user devices. In particular, the pressure reducer assembly comprises a movable shutter positioned in the conduit so as to define a restriction that causes the aforesaid reduction in pressure. The shutter is associated to a motorisation assembly able to be operated to modify the position of the shutter itself.

The regulating system further comprises a sensor assembly that measures the pressure of the gas downstream of the shutter instant by instant. If pressure deviates from a predetermined delivery value, the motorisation assembly is activated in such a way as to move the shutter, so as to modify the pressure drop until bringing the delivery pressure back to the aforesaid predetermined value.

According to a known solution, the motorisation assembly is commanded by a commanding device, for example pneumatic, that receives the signals from the sensor set and processes them to send a signal able to control the motorisation assembly itself.

According to other solutions, the commanding device can be electronic instead of pneumatic.

It is also known that the shutter of the pressure reducer is worn with the passage of time, because of the high velocities of the gas that develop in the restriction. The aforesaid wear affects mostly the gasket of the shutter itself, generally made of rubber or of another suitable material to assure the gas tightness of the shutter. The aforesaid wear entails a reduction of the gas tightness of the shutter, which can lead to a reduction in the operating stability of the pressure reducer and worse safety conditions of the distribution network.

Therefore, to assure the efficiency and safety of the distribution network, it is necessary to perform periodic maintenance on the pressure reducer to replace the rubber gasket of the shutter.

For example, patent application EP0660017A1, having priority date 22 Dec. 1993, discloses a control system for an actuator for pneumatic valves, comprising means for measuring the degree of wear of the sealing elements of a valve, connected to other means configured to emit an alarm signal every time a certain input signal relating to the state of wear is equal to or higher than a predetermined threshold value.

This system has the drawback that the value relating to the state of wear is presumed on the basis of the sensing of the position of the shutter of valve and is signalled only when said value relating to the state of wear exceeds a threshold value.

In the prior art, the aforesaid periodic maintenance is carried out at predetermined time intervals, as established by specific safety standards.

A drawback of the aforementioned prior art is tied to the fact that standards establish the time interval between one maintenance operation and the next on the basis of theoretical criteria, without taking into account the actual operating history of each pressure reducer.

Therefore, in many practical cases, the aforesaid standards are found to be excessively precautionary and can lead to maintenance work being carried out when the pressure reducer is still fully efficient and hence it could still assure safe operation for a certain period of time.

On the other hand, it can also occur that an unusually heavy use of a pressure regulator requires maintenance to be carried out earlier than scheduled. In this case, the performance of the pressure regulator deteriorates before maintenance work is carried out, leading to possible risks for the safety of the system.

Similar drawbacks apply to flow rate control valves, which also comprise a shutter that is commanded in such a way as to control gas flow rate.

SUMMARY OF THE INVENTION

The present invention is intended to overcome the drawbacks of the prior art described above.

In particular, an object of the present invention is to provide a monitoring method that makes it possible to estimate the actual residual life of the shutter of a device for regulating the flow of a gas, of the type usable for example in networks for the distribution and transport of compressed gas, in particular natural gas.

Another object of the invention is to make it possible for the aforesaid monitoring method to be implemented using the same devices as a known regulating system.

Advantageously, the possibility of estimating the actual residual life of the shutter of a regulating device makes it possible to carry out the necessary maintenance work, in particular to replace the sealing gasket of the shutter, when it is actually necessary.

In particular, if use of the regulating device is less heavy than expected, the invention advantageously makes it possible to postpone maintenance with respect to the scheduled time, thus reducing the related labour costs and the amortisation costs of the regulating system.

Conversely, if use of the regulating device is heavier than expected, the method of the invention advantageously makes it possible to carry out the maintenance work earlier than scheduled, limiting safety risks.

Also advantageously, the fact that the method of the invention can be implemented using the same devices as a known regulating system makes it possible to implement it on a pre-existing regulating system at limited costs.

BRIEF DESCRIPTION OF THE DRAWINGS

The aforesaid purposes and advantages, together with others that will be mentioned farther on, will be readily apparent in the course of the following description of some preferred embodiments of the invention, which are given by way of non-limiting indication with reference to the accompanying drawings, where:

FIGS. 3, 4 and 5 show, in diagram form, some operations of the method of the invention.

DETAILED DESCRIPTION OF THE PREFERRED EMBODIMENTS

Figure 1:
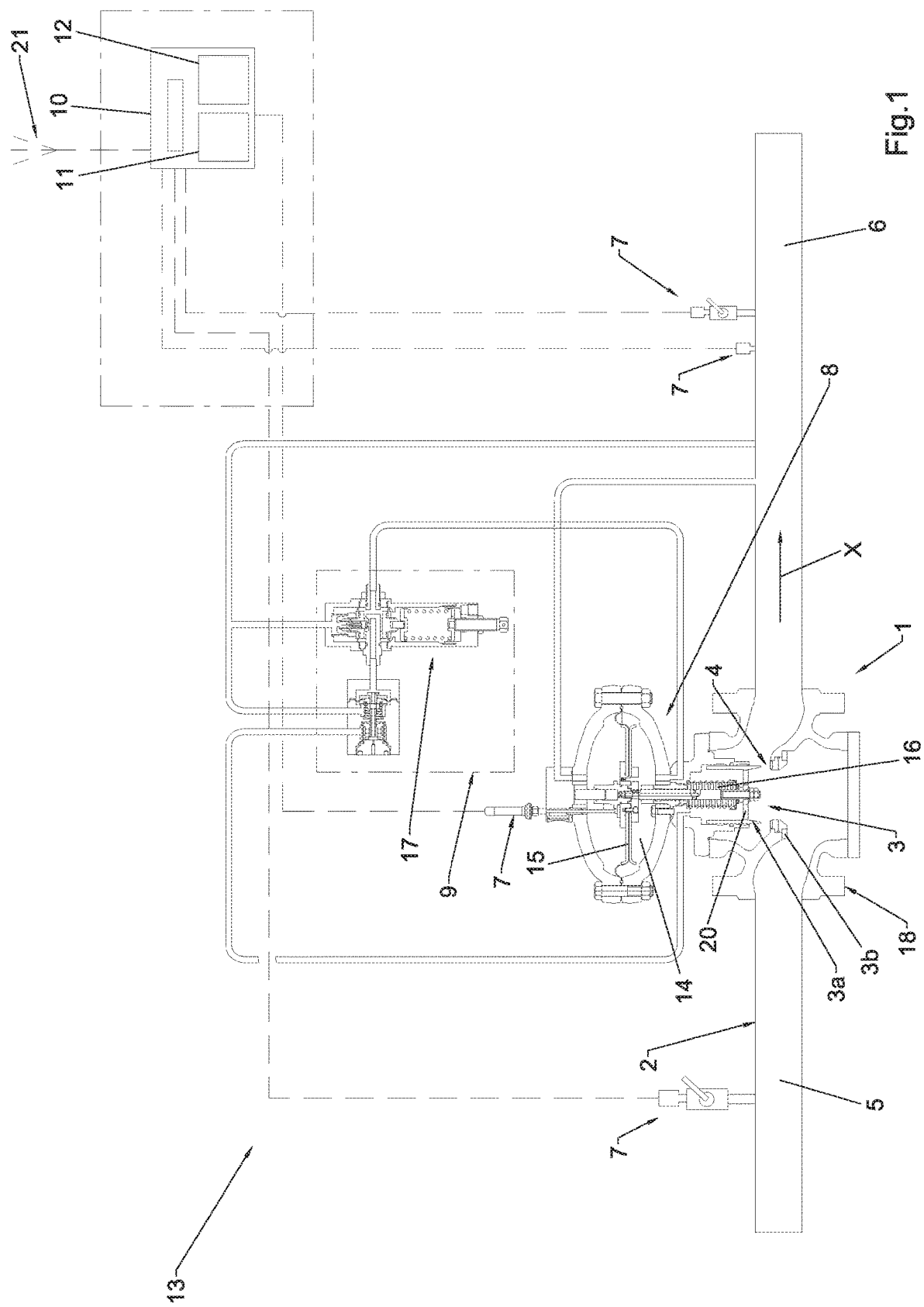
FIG. 1 shows a schematic view of a regulating system according to the invention.

The method of the invention for monitoring a device for regulating the flow of a gas is described below on the basis of a regulating system that is indicated in its entirety in FIG. 1 with the numeral 13. Preferably, the aforesaid regulating system is employed in a network for distributing compressed gas, in particular natural gas, to maintain at a constant level the delivery pressure of the gas to the user devices. However, it will be readily apparent hereafter that the method of the invention is equally applicable to a regulating system able to control the flow rate of the gas.

The aforesaid regulating system 13 comprises a regulating device 1 which defines a flow conduit 2 for the transit of the gas according to a predefined direction X. In the flow conduit 2 is positioned a variable geometry shutter assembly 3 that defines, in the flow conduit 2, a restriction 4 provided with a passage area A. In particular, the restriction 4 is delimited, on two opposite sides, by two respective sealing edges 3a, 3b belonging to the shutter assembly 3, which can be mutually moved until bringing them in contact with each other to close the flow conduit 2. Preferably but not necessarily, one or both sealing edges 3a, 3b are made of rubber, or of another elastically deformable material having similar sealing properties.

The regulating device 1 further comprises a motorisation assembly 8 to move the shutter assembly 3 so as to regulate the passage area A of the restriction 4. Preferably, the motorisation assembly 8 comprises a motorisation chamber 14 in which is present a pressure tied to the pressure downstream of the shutter assembly 3. The motorisation chamber 14 is delimited by a membrane 15 on which acts a spring 16, so that a pressure change in the motorisation chamber 14 causes the movement of the membrane 15. The membrane 15 is also connected to the shutter assembly 3 so that the aforesaid pressure change causes the mutual movement between the two sealing edges 3a, 3b of the shutter assembly 3, so as to change the passage area A of the restriction 4. Also preferably, the pressure in the motorisation chamber 14 is regulated by a command device 9 on the basis of the pressure of the gas downstream of the shutter assembly 3. In particular, the command device 9 is configured to activate the motorisation assembly 8 so as to maintain the pressure in a downstream section 6 to a predefined calibration value. Preferably but not necessarily, the aforesaid command device 9 comprises a pneumatic pilot 17.

Also preferably, a first sealing edge 3a belongs to a movable plate 20 mechanically connected to the membrane 15, for example by means of a transmission shaft, while the second sealing edge 3b is integral with the casing of the regulating device 1.

Clearly, the motorisation assembly 8, the shutter assembly 3 and a part of the flow conduit 2 described above define, in their entirety, a pressure reducer 18 of the type known in itself.

It is also readily apparent that the method of the invention can be applied to a regulating device 1 of any known type, configured to control the pressure and/or the flow rate of the gas.

The regulating system 13 further comprises a sensor assembly 7 for measuring one or more operating parameters of the regulating system 13. Preferably, the aforesaid sensor assembly 7 comprises a gas pressure sensor positioned at a section 5 of the flow conduit 2 upstream of the shutter assembly 3 according to the predefined direction X, as well as a pressure sensor and a gas temperature sensor positioned at a section 6 of the conduit 2 downstream of the shutter assembly 3. In embodiment variants of the invention, the temperature sensor can also be positioned in the upstream section 5.

The regulating system 13 also comprises a control logic unit 10 operatively associated to the sensor assembly 7 and provided with a storage unit 11 and with a clock 12.

Figure 2:
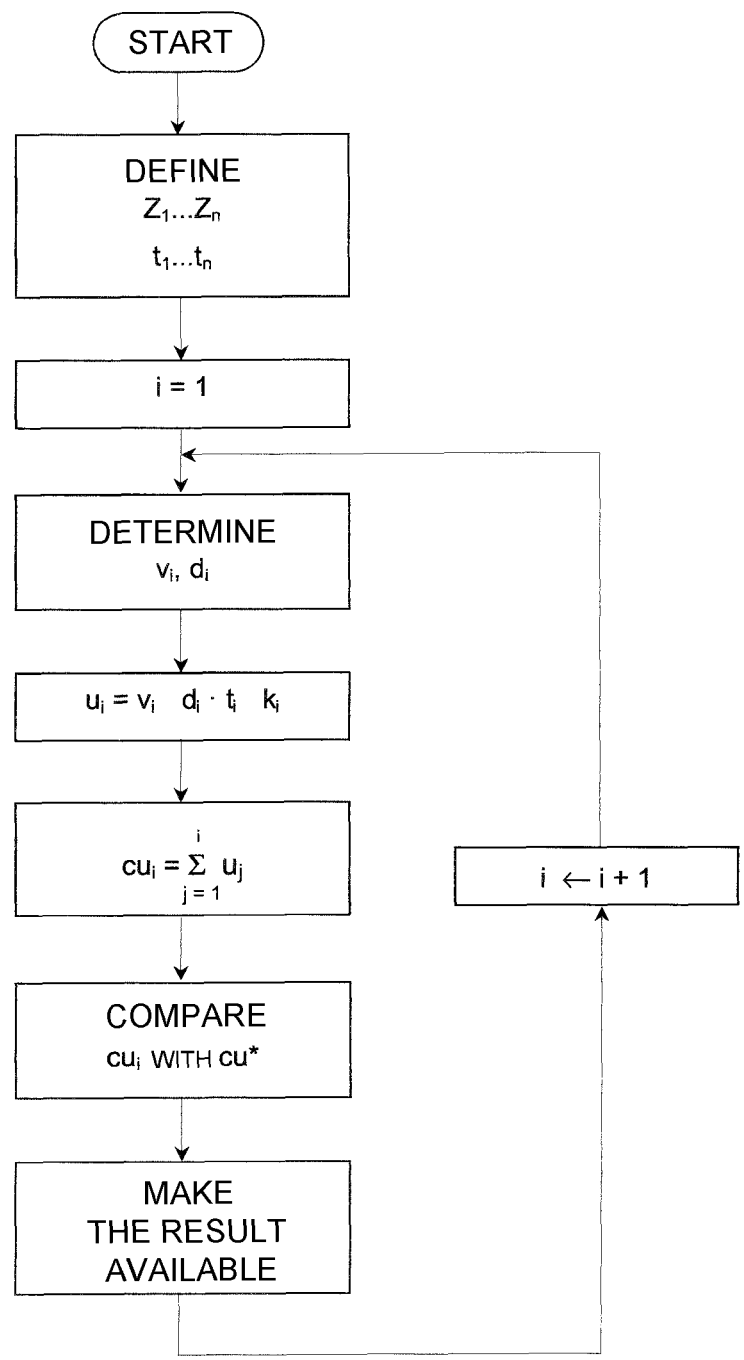
FIG. 2 is a block diagram of the monitoring method of the invention.

The method of the invention, schematically shown in FIG. 2, comprises defining a sequence of time intervals $Z_1 \ldots Z_n$. The notation "$Z_1 \ldots Z_n$" indicates a succession of n time interval included between $Z_1$ and $Z_n$, where $Z_1$ and $Z_n$ are respectively the first and the last in time, while with $Z_i$ between 1 and n, is any time interval of the succession and, in time, it immediately follows the interval $Z_{i-1}$ and it immediately precedes the interval $Z_{i+1}$.

It is hereby specified that the intervals of the sequence $Z_1 \ldots Z_n$ are not necessarily defined before the start of the method. On the contrary, preferably each interval $Z_i$ is defined from time to time at the end of the preceding time interval and added to the sequence. Similarly, the number n indicates only the last time interval of the sequence whereat the method is considered to be concluded and, therefore, it need not be defined before defining the time intervals of the sequence.

Each generic time interval $Z_i$ extends for a corresponding time duration $t_i$. It is hereby specified that the time duration and the other quantities that will be defined hereafter with reference to each of the aforesaid intervals are indicated with the same subscript as the corresponding time interval.

Preferably, the durations $t_1 \ldots t_n$ are equal to each other.

Also preferably, the time intervals $Z_1 \ldots Z_n$ are defined so that the end of the generic interval $Z_i$ coincides with the start of the interval $Z_{i+1}$, so that the time intervals follow each other without interruptions.

The method comprises estimating, for each interval $Z_i$, a velocity value $v_i$ and a density value $d_i$ of the gas at the restriction 4.

FIG. 3 shows, merely by way of example and in a qualitative manner, a possible pattern of the values of velocity $v_i$ and of density $d_i$ calculated for each generic time interval $Z_i$ belonging to the series $Z_1 \ldots Z_n$. The dashed lines v and d represent respective interpolations of the aforesaid points. Although each velocity $v_i$ and density $d_i$ are shown at the centre of the corresponding time interval $Z_i$, this indication does not limit the invention, which in embodiment variants may provide for the aforesaid values $v_i$ and $d_i$ are calculated with reference to any respective instants belonging to the time interval $Z_i$, including its ends.

Subsequently, the method comprises calculating the product of the value of velocity $v_i$, of the value of density $d_i$, of the duration $t_i$ of the time interval $Z_i$ and of a correction coefficient $k_i$ to obtain a value $u_i$, according to the following formula:

$$u_i = d_i \cdot t_i \cdot k_i \qquad (3)$$

The aforesaid formula (3) expresses the fact that $u_i$ is proportional to the product $v_i \cdot d_i$ and to the duration $t_i$ of the period $Z_i$, less the correction coefficient $k_i$. It is interesting to note that this product is tied to the quantity of motion of the total amount of gas that flowed through the restriction 4 during the period $Z_i$.

As shown in FIG. 4, each value of $u_i$ approximates the area subtended by a hypothetical curve of instantaneous wear u, represented in the figure with a dashed line, during the corresponding period of time $Z_i$. In other words, each value of $u_i$ represents an approximation of the value of the integral of the curve u during the time interval $Z_i$.

The applicant filing the present invention has observed that the wear of the sealing members of the regulating device 1, i.e., of the sealing edges 3a and/or 3b of the shutter assembly 3, during each time interval $Z_i$ are to a large extent proportional to the corresponding value of $u_i$ defined above. For this reason, this value $u_i$ will be called "equivalent wear" hereafter.

The precision of the correspondence between the equivalent wear described above and the actual wear of the shutter group 3 depends, clearly, both on the accuracy of the calculations used to estimate the velocity and the density of the gas at the restriction 4, and on the duration $t_i$ of the time interval $Z_i$. In particular, a shorter duration entails smaller calculation errors, inasmuch as the variation in the pressure and temperature of the gas during the interval and, hence, in velocity and density during that interval, generally grow as the duration of that interval grows. On the other hand, longer intervals entail less frequent and less numerous measurements and, hence, they make it possible to use less powerful instruments and calculation devices.

As represented in FIG. 5, for each time interval $Z_i$ a cumulative value $cu_i$ of equivalent wear is calculated, corresponding to the sum of all values of equivalent wear $u_1 \ldots u_i$ calculated for the time intervals from $Z_1$ to $Z_i$.

As described above, the values of $u_i$ represent the equivalent wears of the shutter assembly 3 for the corresponding intervals $Z_i$, therefore their sum represents the cumulative wear starting from the start of the measurement, i.e., from the initial instant of the first time interval $Z_1$.

The method comprises comparing the aforesaid cumulative values $cu_i$ with a predefined limit value $cu^*$, corresponding to a condition of maximum wear allowable for the shutter assembly 3, using a predetermined comparison method, to obtain an indication of the condition of efficiency of the shutter assembly 3.

More specifically, the aforesaid limit value $cu^*$ represents the equivalent wear corresponding to the reached inefficiency of the shutter assembly 3, evaluated on the basis of determined safety criteria.

Based on the outcome of the aforesaid comparison, an operator can establish whether the shutter assembly 3 has to be replaced, and/or an estimate can be obtained of the residual duration thereof, thereby achieving one of the objects of the invention.

Preferably, the method for comparing the cumulative values $cu_i$ with the predefined limit value $cu^*$ comprises the operation of establishing whether each cumulative value $cu_i$ exceeds the predefined limit value $cu^*$, preferably reporting this eventuality to the operator.

According to a different embodiment variant of the method of the invention, the comparison of the cumulative value $cu_i$ with the predefined limit value $cu^*$ comprises the definition of a wear curve on the basis of the preceding cumulative values $cu_i$ and the subsequent calculation of the time interval between the current instant and the one in which the aforesaid wear curve intersects the predefined limit value $cu^*$. The aforesaid wear curve thus represents an estimate of the future pattern of the accumulated wear on the basis of the sequence of the preceding values of accumulated wear, and it can be defined in any known way, for example through the least squares method.

Preferably, the values of velocity $v_i$ and of density $d_i$ are determined as a function of one or more operating parameters determined during each time interval $Z_i$ of the sequence. The aforesaid operating parameters can be selected between the two values of pressure $p_{i,1}$, $p_{i,2}$ of the gas respectively in the aforesaid two sections 5, 6 of the flow conduit 2, the value of temperature $T_i$ of the gas in one of the aforesaid two sections 5, 6, for example in the downstream section 6, the volumetric flow rate $q_{vi}$ of the gas along the flow conduit 2 and the value of the passage area $A_i$ of the restriction 4.

One or more of the aforesaid operating parameters are determined, preferably, through a measurement thereof carried out by means of the sensor assembly 7 of the regulating system 13. Moreover, one or more of the aforesaid operating parameters can be determined by a calculation of the respective values on the basis of the other operating parameters.

According to an embodiment variant of the invention, the values of velocity $v_i$ and of density $d_i$ are calculated employing respective functions of the aforesaid two pressure values $p_{i,1}$, $p_{i,2}$, of the temperature value $T_i$ and of the value of volumetric flow rate $q_{vi}$, i.e.:

$$v_i = f_1(p_{i,1}, p_{i,2}, T_i, q_{vi}) \quad (1)$$

$$d_i = f_2(p_{i,1}, p_{i,2}, T_i, q_{vi}) \quad (2)$$

It should be noted that the functions $f_1$ and $f_2$ are not necessarily functions in the most common meaning of the term, but can also be numerical algorithms, provided they use the values of $p_{i,1}$, $p_{i,2}$, $T_i$, $q_{vi}$ as input variables and they yield $v_i$ and $d_i$ as output values.

Clearly, according to embodiment variants of the invention the operating parameters employed to calculate the values of $v_i$ and $d_i$ can be different from the ones described above. For example, in an embodiment variant, instead of the values of one of the pressures $p_{i,1}$ or $p_{i,2}$, the values of the passage area $A_i$ are employed.

Preferably but not necessarily, the aforesaid values of velocity $v_i$ and of density $d_i$ represent averages of the respective quantities of the gas at the restriction 4. According to a variant of the invention, the aforesaid values are those at the sealing edges 3a or 3b, or an average thereof.

Concerning the correction coefficient $k_i$, it is preferably equal to 1. However, in embodiment variants of the invention, $k_i$ can assume a value other than 1. In particular, $k_i$ can vary according to the type of regulating device 1. Alternatively, or in combination to what has just been stated, $k_i$ can also be calculated at each time interval $Z_i$ as a function of operating parameters, for example of the aforesaid pressures $p_{i,1}$ and $p_{i,2}$, of the temperature $T_i$ and of the flow rate $q_{vi}$.

Preferably, the calculations described above are carried out by the control logic unit 10, which receives the data measured by the sensor assembly 7. Receipt of the data can take place indifferently by means of a direct electrical connection with the sensor assembly 7, if the control logic unit 10 is located in the immediate vicinity of the regulating device 1, or it can take place by means of radio waves, in which case the control logic unit 10 can be located remotely.

Moreover, the control logic unit 10 is provided with appropriate means for calculating, at each time interval $Z_i$, the corresponding values of velocity $v_i$ and of density $d_i$, as well as the product of the value of velocity $v_i$, of the value of density $d_i$, of the duration $t_i$ and of the correction coefficient $k_i$ to obtain the corresponding value of equivalent wear $u_i$.

In particular, the control logic unit 10 uses the clock 12 for counting the duration of each interval $Z_i$ and for establishing when to determine the values of the operating parameters, for example the measures of the pressures $p_{i,1}$, $p_{i,2}$, of the temperature $T_i$ and of any other parameters required for calculating the functions $f_1$ and $f_2$.

The control logic unit 10 is also configured to calculate the cumulative value $cu_i$ for each time interval $Z_i$, to compare it with the limit value $cu^*$ stored in the storage unit 11, and to emit the aforesaid signal if the cumulative value $cu_i$ exceeds the limit value $cu^*$.

Preferably, the control logic unit 10 comprises means for storing the cumulative value $cu_i$ in the storage unit 11, to be able to use it as the basis for calculating the cumulative value $cu_{i+1}$ for the following interval $Z_{i+1}$. Advantageously, this avoids having to store all the values of equivalent wear $u_i$ and, hence, it limits memory utilisation.

According to an embodiment variant, the control logic unit 10 can comprise means for storing in the storage unit 11 the values of equivalent wear $u_i$ of each time interval $Z_i$ and possibly to add them to the preceding values to obtain each cumulative value $cu_i$.

According to an additional embodiment variant, the control logic unit 10 can comprise means for storing in the storage unit 11 one or more values of the operating parameters, for example of the pressures $p_{i,1}$, $p_{i,2}$ and of the temperature $T_i$, and/or of the volumetric flow rate $q_{vi}$, of the velocity $v_i$, of the density $d_i$ and of the value of the passage area $A_i$ or of a representative parameter of the configuration of the shutter 3, determined for each interval $Z_i$.

Storing the various parameters of each interval $Z_i$ in the storage unit 11 makes it possible to perform analyses on the operation of the regulating device 1 over time.

Concerning the calculation of the cumulative value $cu_i$, its comparison with the limit value $cu^*$ and the possible emission of the related signal, these operations preferably take place immediately after determining the values of the operating parameters, for example of the pressures $p_{i,1}$, $p_{i,2}$, of the temperature $T_i$ and of the volumetric flow rate $q_{vi}$, during each interval $Z_i$ or at the end thereof.

The aforesaid signal is preferably emitted through a communication device 21 connected to the control logic unit 10. In this case, a receiver device is provided, not shown in the drawings but known per se, able to make the signal available to an operator. The communication device 21 can communicate with the receiver device by means of signals of any known type, in particular by means of analogue or digital radio signals.

Alternatively or in combination with the aforesaid communication device 21, the control logic unit 10 can integrate a signaller device, not shown in the drawings, able to make the signal available to an operator present in the vicinity of the control logic unit 10 itself. The aforesaid signaller device can comprise a display, a light indicator, a sound indicator, or any other type of device able to reproduce the aforesaid signal in any form able to be made available to an operator.

According to an additional embodiment variant of the invention, the aforesaid communication device 21 can be employed to transmit the data of the gas acquired from the sensor assembly.

Concerning the algorithm for calculating velocity $v_i$ and density $d_i$, comprising for example the aforesaid functions $f_1$ and $f_2$, it can be determined for each type of regulating device 1 through laboratory tests and/or through computational fluid dynamics algorithms implemented on computers.

Concerning the determination of the volumetric flow rate $q_{vi}$, it can be calculated as a function of the values of the pressures $p_{i,1}$, $p_{i,2}$, of the temperature $T_i$ and of the passage area $A_i$ of the restriction 4 during the corresponding time interval $Z_i$. In turn, the value of the passage area $A_i$ can be calculated as a function of the configuration of the shutter assembly 3, detectable for example by a position sensor belonging to the sensor assembly 7.

The aforesaid calculations can be carried out by means of formulas known in themselves and specified in the reference standards. For example, $q_{vi}$ can be expressed as a function of the pressures of the gas and of a coefficient $c_{gi}$ characteristic of each pressure regulator, which in turn is a function of the degree of opening of the shutter 3, according to the proportionality relationship:

$$q_{vi} \infty c_{gi} \cdot p_{i,1}$$

or according to the proportionality relationship:

$$q_{vi} \infty c_{gi} \cdot p_{i,1} \cdot \sin\{k \cdot \sqrt{[(p_{i,1}-p_{i,2})/p_{i,1}]}\}$$

Alternatively, the volumetric flow rate $q_{vi}$ can be measured along the flow conduit 2 during the corresponding time interval $Z_i$ by means of a flow rate, or volume, measuring device that is known in itself.

It should be noted that all the operations described above for the method of the invention can be carried out by any control device comprising a control logic unit 10, a storage unit 11 and a clock 12. This type of control devices is already known and widely used to control natural gas distribution networks and, therefore, it can be adapted to the implementation of the aforesaid method through a software update, without requiring any structural modification, thus achieving another object of the invention.

In particular, advantageously, the aforesaid software update can be carried out directly in the field on command devices that are already installed.

It is readily apparent that the method can also be employed on distribution networks not comprising the control devices of the type described above. In this case, it will be sufficient to add to the network a control device suitable for executing the method and/or any sensors that are not already present.

Concerning the predefined limit value $cu^*$, it is determined preferably by means of a collection of data coming from regulating devices already installed in the field.

Alternatively, the predefined limit value $cu^*$ can be determined in the laboratory, setting up a test bench provided with a test device operatively equivalent to the regulating device 1 to be monitored. The term "operatively equivalent" means a test device that, for equal conditions and operating configuration, produces the same transformation on the gas as is produced by the regulating device 1 to be monitored, in particular the same pressure drop for equal opening of the shutter. Preferably, the test device is a regulating device identical to the one to be monitored.

The gas is then made to transit through the shutter assembly 3 of the test device. During the aforesaid transit, predefined conditions of pressure and temperature are maintained in the flow conduit 2 of the test device, upstream or downstream of the shutter assembly 3.

For each time instant of a predefined sequence of time instants, and starting from a first time instant, the pressure is measured on a section of the flow conduit 2 positioned, with respect to the shutter assembly 3, on the side opposite to the one in which the aforesaid predefined conditions are maintained. Moreover, a control parameter indicative of the efficiency of the test device is monitored.

When, in a second time instant, the aforesaid control parameter reaches a predetermined reference value, representative of a condition of inefficiency of the test device, a calculation is obtained of the product of the velocity times the density of the total gas that flowed through the restriction 4 of the test device between the first time instant and the second time instant. The aforesaid values of velocity and density of the gas are calculated as a function of the aforesaid predefined conditions of pressure and temperature, of the pressures measured in the aforesaid time instants and of the passage area A of the restriction 4.

Subsequently, the aforesaid product is multiplied times a predefined coefficient to obtain the limit value cu*, which represents the equivalent wear corresponding to the condition in which the efficiency of the regulating device 1 is no longer acceptable.

Concerning the aforesaid control parameter, it can coincide with the pressure measured on the section of the flow conduit 2 positioned, with respect to the shutter assembly 3, on the side opposite to the one in which the predefined conditions are maintained. The condition of reached inefficiency of the test device can be defined conventionally as the condition in which the measured rate of wear is such as to affect the correct functionality of the pressure regulator.

In view of the above, it is understood that the regulating method and system described above achieve all the objects of the invention.

In particular, the calculation of an equivalent wear proportional to the product of the velocity and of the density of the gas that flowed through the restriction, integrated during a time interval starting from an initial instant, makes it possible to estimate in real time the residual life of the shutter of the regulating device on the basis of the actual use thereof and, hence, it enables to carry out the necessary maintenance work when it is actually necessary.

Moreover, the aforesaid method can be implemented on known regulating devices comprising a control logic unit and a sensor assembly, even if they are already installed, by means of a simple adaptation of the software of the control logic unit.

The invention claimed is:

1. A method for monitoring a device for regulating the flow of a gas, said regulating device comprising a flow conduit along which a shutter assembly is positioned which is able to define in said flow conduit a restriction that defines a passage area for said gas, said method comprising the following operations:
   a) causing the transit of a gas through said flow conduit according to a predefined direction;
   b) defining a sequence of time intervals, each of which extends for a corresponding duration;
   c) during each time interval of said sequence, determining a value of density and a value of velocity of said gas at said restriction;
   d) calculating the product of said value of density, of said value of velocity, of the duration of said time interval and of a correction coefficient to obtain a corresponding value of equivalent wear;
   e) for each time interval of said sequence, adding all the values of equivalent wear calculated for said time interval and for each of the time intervals that precede said time interval in said sequence to obtain a cumulative value;
   f) comparing said cumulative values with a predefined limit value, corresponding to a condition of maximum wear allowable for said shutter assembly, using a predefined comparison method, to obtain an indication of the condition of efficiency of said shutter assembly.

2. The method according to claim 1, wherein said predetermined comparison method comprises the operation of determining whether a cumulative value calculated for a time interval exceeds said predefined limit value.

3. The method according to claim 1, wherein said predetermined comparison method comprises the following operations:
   defining an expected wear curve on the basis of the cumulative values;
   calculating the time interval between a current instant and the instant in which said expected wear curve intersects said predefined limit value.

4. The method according to claim 1, further comprising the operation of determining one or more operating parameters during each time interval of said sequence, said one or more operating parameters being selected between a first value of pressure of said gas in a section of said flow conduit positioned upstream of said shutter assembly according to said predefined direction, a second value of pressure of said gas in a section of said flow conduit positioned downstream of said shutter assembly according to said predefined direction, a value of temperature of said gas in one of said two sections, a value of volumetric flow rate of said gas along said flow conduit, and a value of said passage area of said restriction, and in that said value of density and said value of velocity are determined as a function of said one or more operating parameters.

5. The method according to claim 4, wherein said one or more operating parameters is determined through a measurement or through a calculation.

6. The method according to claim 4, wherein said volumetric flow rate is calculated as a function of said first value of pressure, of said second value of pressure, of said value of temperature and of said value of said passage area.

7. The method according to claim 4, wherein said volumetric flow rate is measured in one of said two sections during the corresponding time interval by means of a flow rate measuring device.

8. The method according to claim 4, wherein said correction coefficient is defined for each time interval as a function of the operating parameters determined for said time interval.

9. The method according to claim 1, further comprising an operation of moving said shutter assembly so as to modify said passage area during said transit of said gas.

10. The method according to claim 9, wherein said operation of moving said shutter assembly is carried out in such a way as to maintain the pressure, or the volumetric flow rate, of said gas in a section of said flow conduit downstream of said shutter assembly at a predefined calibration value.

11. The method according to claim 1, further comprising an operation of replacing all or part of said shutter assembly as a result of the reception of said signal.

12. The method according to claim 1, further comprising an operation of determining said predefined limit value, which comprises the following operations:
   providing a test device operatively equivalent to said regulating device, provided with a corresponding test conduit and with a corresponding test shutter assembly able to define a test restriction in said test conduit;

causing the transit of said gas through said test restriction;

during said transit, maintaining predefined conditions of pressure and temperature in said test conduit upstream or downstream of said test restriction;

for each time instant of a sequence of time instants and starting from a first time instant, measuring the pressure in said test conduit on a section positioned, with respect to said test restriction, on the side opposite to the one in which said predefined conditions are maintained;

monitoring the value of a control parameter representative of the efficiency of said test shutter assembly;

determining a second time instant of said sequence of time instants in which the value of said control parameter reaches a predetermined reference value, representative of a condition of inefficiency of said test shutter assembly;

calculating the product of the velocity and of the density of all the gas that flowed through said restriction between said first time instant and said second time instant as a function of said predefined pressure and temperature conditions, of the pressures measured in said time instants, and of the passage area of said restriction;

multiplying said product times a predefined coefficient to obtain said predefined limit value.

13. The method according to claim 12, wherein said control parameter is the pressure measured in said test conduit on said section positioned, with respect to said test shutter assembly, on the side opposite to the one in which said predefined conditions are maintained.

14. A system for regulating the flow of a gas comprising:

a regulating device provided with a flow conduit for the transit of said gas according to a predefined direction, of a shutter assembly positioned along said flow conduit to define in said flow conduit a restriction which defines a passage area, and a motorisation assembly of said shutter assembly to move it so as to regulate said passage area;

a sensor assembly configured to measure one or more operating parameters of said regulating system;

a command device configured to activate said motorisation assembly on the basis of the values of said one or more operating parameters so as to maintain the pressure in a section downstream of said shutter assembly, or the flow rate along said flow conduit, at a predefined calibration value;

a control logic unit operatively associated to said sensor assembly and comprising a storage unit and a clock;

a device for determining a value of volumetric flow rate of said gas along said flow conduit, said control logic unit comprising means for calculating, at each time interval of a predefined sequence, of time intervals extending for corresponding durations, the following values:

a value of velocity and a value of density of said gas at said restriction as a function of said one or more operating parameters determined during said time interval and of a value of volumetric flow rate of said gas along said flow conduit determined during said time interval;

the product of said value of velocity, of said value of density, of the duration of said time interval and of a correction coefficient to obtain a corresponding value of equivalent wear;

said control logic unit being also configured for:

calculating, for each time interval of said sequence, a cumulative value equal to the sum of the values of equivalent wear corresponding to said time interval and to all of the time intervals that precede said time interval in said sequence;

storing in said storage unit said cumulative value and/or said value of equivalent wear of each time interval;

comparing said cumulative values with a predefined limit value stored in said storage unit and corresponding to a condition of maximum wear allowable for said shutter assembly, using a predetermined comparison method, to obtain an indication of the condition of efficiency of said shutter assembly.

15. The regulating system according to claim 14, wherein said device for determining a value of volumetric flow rate comprises a sensor for determining the configuration of said shutter.

16. The regulating system according to claim 14, wherein said device for determining a value of volumetric flow rate comprises a device for measuring volumetric flow rate.

* * * * *